L. A. PRINCE.
RUNNING BOARD BRACE FOR AUTOMOBILES.
APPLICATION FILED OCT. 4, 1917.
1,297,730.
Patented Mar. 18, 1919.
2 SHEETS—SHEET 1.
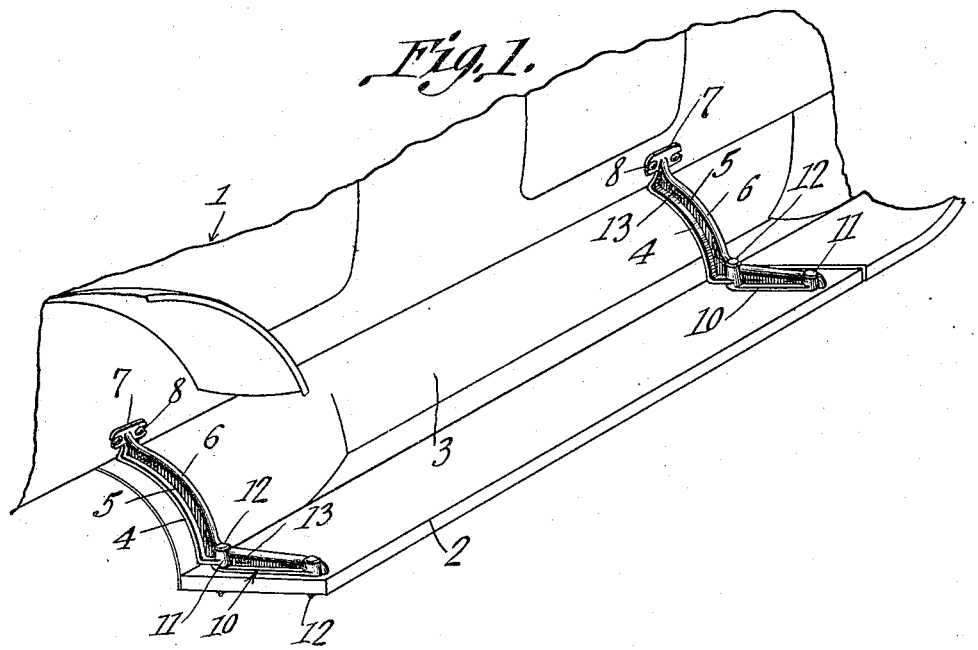
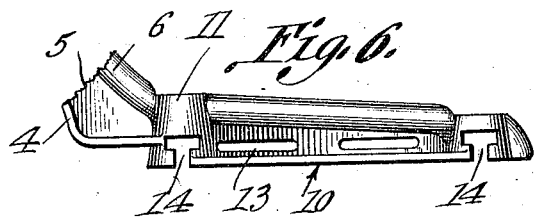
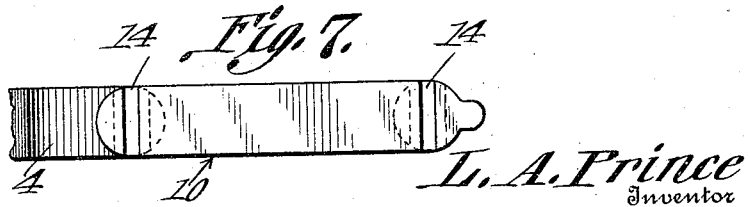
L. A. Prince
Inventor
By
Attorneys L. A. PRINCE.
RUNNING BOARD BRACE FOR AUTOMOBILES.
APPLICATION FILED OCT. 4, 1917.
1,297,730.
Patented Mar. 18, 1919.
2 SHEETS—SHEET 2.
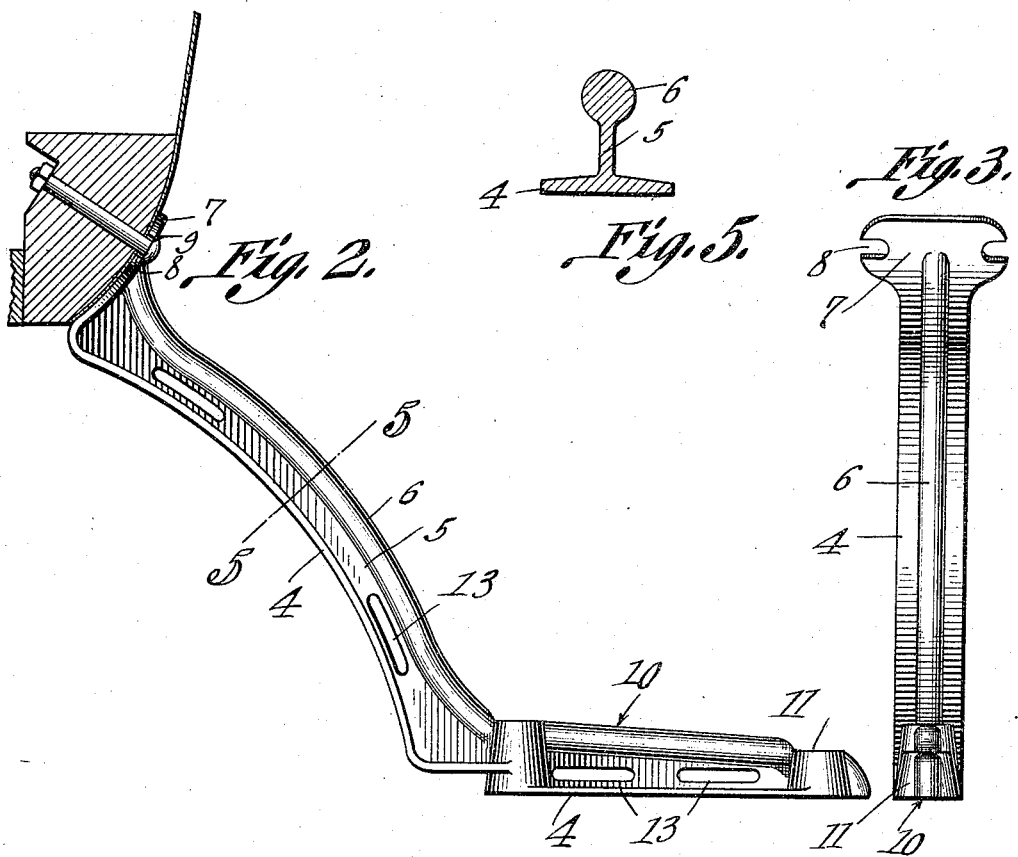
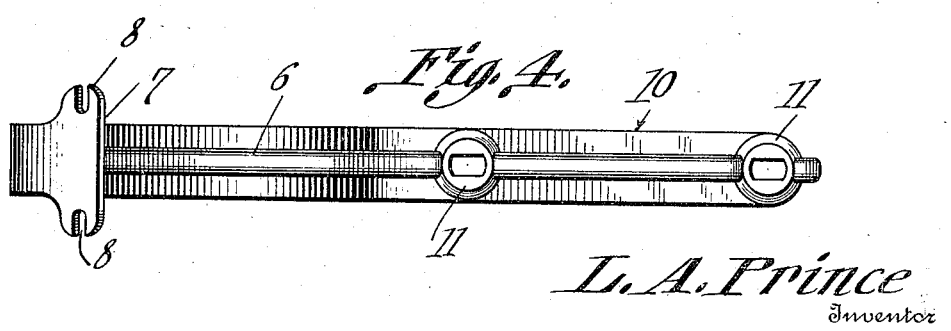
L. A. Prince
Inventor

UNITED STATES PATENT OFFICE.

LOUIS ARTHUR PRINCE, OF SUMTER, SOUTH CAROLINA.

RUNNING-BOARD BRACE FOR AUTOMOBILES.

1,297,730.

Specification of Letters Patent. Patented Mar. 18, 1919.

Application filed October 4, 1917. Serial No. 194,689.

*To all whom it may concern:*

Be it known that I, LOUIS ARTHUR PRINCE, a citizen of the United States, residing at Sumter, in the county of Sumter and State of South Carolina, have invented certain new and useful Improvements in Running-Board Braces for Automobiles, of which the following is a specification, reference being had to the accompanying drawing.

The subject of this invention is a brace for the running board of an automobile, and the objects of the invention are, first, to provide means for supporting and strengthening the running board of an automobile, second to provide means for supporting articles on the running board, third, to prevent vibration of the running board, fourth, to provide a simple and efficient brace for the running board.

With the foregoing and such other objects in view as may appear as the description proceeds, the invention consists in the novel arrangement and construction of parts, one practical embodiment of which is set forth in the following description and claimed in the claims, it being understood, however, that changes may be made within the scope of the claims, without departing from the spirit of the invention.

A practical embodiment of the invention is shown in the accompanying drawing, wherein:—

Figure 1 is a perspective view of a portion of an automobile with braces constructed in accordance with the present invention in place thereon;

Fig. 2 is a side elevation of a brace, a fragment of an automobile to which it is attached shown in section;

Fig. 3 is a front elevation;

Fig. 4 is a plan view;

Fig. 5 is a cross section taken on the line 5—5 of Fig. 2.

Fig. 6 is a side elevation of a fragment of a modified form;

Fig. 7 is a bottom plan view of the same.

Referring to the drawings by numerals of reference:—

An automobile is indicated generally at 1 which is provided with the usual running board 2, and with an apron 3 extending from the running board to the body of the automobile.

The brace which, as seen, is adapted to overlie the apron and running board, is preferably formed of a metal bar consisting of a base plate 4, from the center of which rises a web 5 which extends longitudinally of the base plate and is surmounted by a cylindrical portion or bead 6.

At the upper end the brace merges into a transverse plate 7 formed with open slots 8 to receive bolts 9 or other means for attaching the brace to the car body.

From the plate 7 the brace extends outwardly and downwardly along curved lines to conform to the curve of the apron 3, and terminates in a substantially horizontal foot 10. Two frustro-conical reinforcements 11 are formed on the foot 10 and each reinforcement is provided with a central slot for the reception of a bolt 12 which secures the foot to the running board.

Slots or apertures 13 may be formed in the web 5 of the brace for the purpose of receiving straps to bind articles, such as a trunk or the like, on the running board.

The modified form shown in Figs. 6 and 7 is similar to that just described except that the foot of the brace is slotted or cored, as indicated at 14, to receive the heads of the bolts by which the foot is made fast to the running-board.

Having thus described the invention, what is claimed as new and sought by Letters Patent, is:—

1. In an automobile, the combination with a running board and apron, of a combined brace and luggage carrier comprising a member having a plurality of spaced strap slots and adapted to overlie and conform to the contour of the apron and upper surface of the running board, with said slots located of the running board, with said slots located above said apron and running board, and means for attaching the brace to the running board.

2. The combination with an automobile including a running board and apron, of a combined running board brace and luggage carrier comprising a plate, means for attaching the plate to the body of the automobile, an arm having a plurality of spaced strap slots, said arm extending from the plate and overlying the apron with said slots located above said apron, a foot integral with said arm and having a plurality of spaced strap slots located above the running board, and means for securing the foot to the running board.

3. A running board brace of the character described comprising a plate, said plate adapted for attachment to the body of an automobile, an arm extending from the plate, a foot integral with the arm, and frusto-conical reinforcements on the foot provided with apertures for the reception of running board bolt heads.

In testimony whereof I hereunto affix my signature in the presence of two witnesses.

LOUIS ARTHUR PRINCE.

Witnesses:
A. L. SHAW,
DORA SMITH.

Copies of this patent may be obtained for five cents each, by addressing the "Commissioner of Patents, Washington, D. C."